United States Patent [19]
Yoda

[11] 3,944,177
[45] Mar. 16, 1976

[54] DEVICE FOR FIXING PIPES, RODS AND OTHER ELONGATED BODIES

[75] Inventor: Takuo Yoda, Yokohama, Japan
[73] Assignee: Nifco Inc., Tokyo, Japan
[22] Filed: Nov. 26, 1974
[21] Appl. No.: 527,340

[30] Foreign Application Priority Data
Dec. 5, 1973 Japan.......................... 48-138911[U]

[52] U.S. Cl. .............. 248/74 A; 24/73 AP; 248/73; 248/74 PB
[51] Int. Cl.² ........................................... F16L 3/08
[58] Field of Search ........ 248/74 A, 74 R, 73, 74 B, 248/74 PB, 50, 68 R; 24/73 SA, 73 AP, 73 PB, 255 C, 257 R; 52/677, 686, 689, 688

[56] References Cited
UNITED STATES PATENTS

| | | | |
|---|---|---|---|
| 1,722,363 | 7/1929 | Young | 248/50 |
| 2,478,808 | 8/1949 | Deal | 248/74 A X |
| 2,534,690 | 12/1950 | Young et al. | 248/68 R |
| 2,543,997 | 3/1951 | Vavra et al. | 248/68 R |
| 2,744,708 | 5/1956 | Bedford | 248/73 |
| 3,032,603 | 5/1962 | Whitley | 24/73 SA X |
| 3,077,018 | 2/1963 | Cochran | 24/73 SA |
| 3,244,803 | 4/1966 | Becker | 248/74 B X |
| 3,627,300 | 12/1971 | Caveney et al. | 24/257 R X |

FOREIGN PATENTS OR APPLICATIONS

| | | | |
|---|---|---|---|
| 959,083 | 5/1964 | United Kingdom | 24/257 R |
| 1,484,980 | 1/1969 | Germany | 52/677 |
| 1,028,026 | 5/1966 | United Kingdom | 248/68 R |
| 314,249 | 6/1956 | Switzerland | 248/74 A |
| 599,050 | 3/1948 | United Kingdom | 248/74 PB |

*Primary Examiner*—Roy D. Frazier
*Assistant Examiner*—Rodney H. Bonck
*Attorney, Agent, or Firm*—Jack R. Halvorsen; Robert W. Beart

[57] ABSTRACT

Disclosed is a clamp for fixing pipes, rods and other elongated bodies. The device essentially comprises a U-shaped housing and a V-shaped fitting piece which is capable of being folded and is supported by a flexible supporting piece above said U-shaped housing in the open position. In use an object is wrapped by the V-shaped fitting piece, and the so wrapped object is snapped in the U-shaped opening of the housing and is caught by the vertical walls of the housing. The unique structure of the device assures an easy and reliable operation.

2 Claims, 4 Drawing Figures

DEVICE FOR FIXING PIPES, RODS AND OTHER ELONGATED BODIES

BACKGROUND OF THE INVENTION

This invention relates to a device for fixing pipes, rods and other elongated bodies to a panel or plate which constitutes, for instance, a part of an apparatus or machine.

The object of this invention is to provide a plastic device for fixing pipes, rods and other elongated bodies to a panel or plate by an easy and simple operation and without any fear of marring the surface appearance of the elongated body.

SUMMARY OF THE INVENTION

To attain this object a device for fixing pipes, rods and other elongated bodies according to this invention comprises, in combination, a base plate, an anchor vertically provided on the underside of said base plate, a U-shaped housing portion provided on the topside of said base plate and composed of a pair of opposed vertical walls each having an engaging projection at the opening edge thereof, and a V-shaped fitting piece capable of being double folded, provided above the opening of said housing portion, said fitting piece having two wings each connected with said vertical wall through a flexible supporting piece and engaging panels each provided on the outer side of said wing, whereby an object such as a pipe, rod, etc. is fixed in a non-returnable state by allowing said pawls to be engaged with said projections respectively when said object is fitted within said fitting piece and then is put within said housing portion.

This invention will be better understood from the following description which is made with reference to the accompanying drawings.

Figure 1:
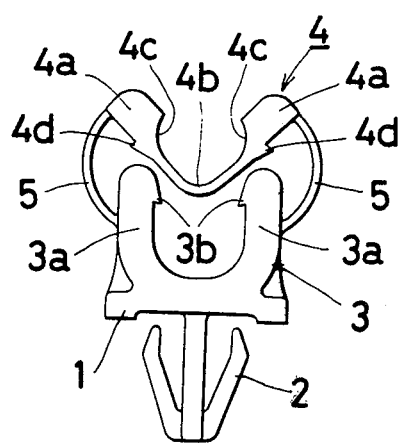
FIG. 1 is a front view of an embodiment of this invention.
Figure 2:
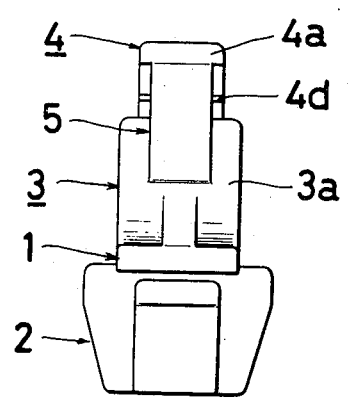
FIG. 2 is a side view of the embodiment.
Figure 3:
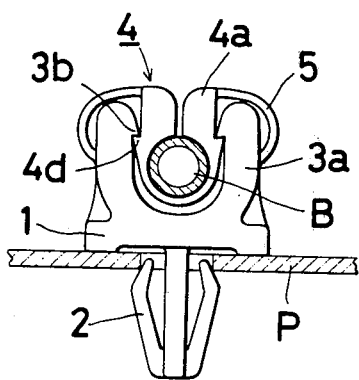
FIG. 3 is a front view of the embodiment in the state of being used.
Figure 4:
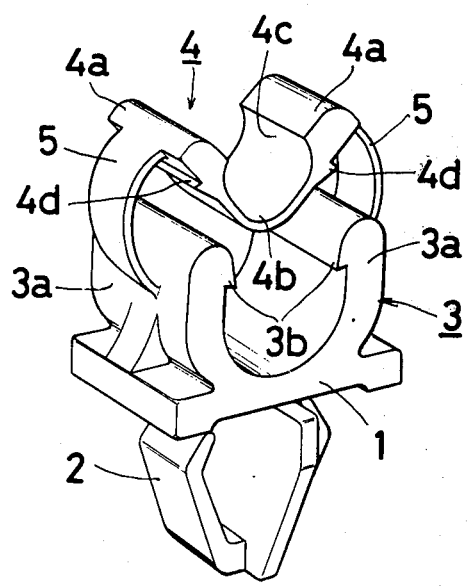
FIG. 4 is a perspective view of the embodiment in exaggerated scale.

DETAILED DESCRIPTION OF THE INVENTION:

Referring to the drawings, 1 is a base plate; and 2 is an anchor vertically provided on the underside of the base plate for fixing the base plate to a panel P; and 3 is a U-shaped housing portion rising from the topside of the base plate 1. The housing portion 3 is composed of a pair of opposed vertical walls 3a, 3a, and is shaped in the form of a U as a whole. Each vertical wall has an engaging projection 3b at the opening edge thereof. 4 is a V-shaped fitting piece, and 5 is a flexible supporting piece. As shown in the drawings, a pair of flexible supporting pieces connect the V-shaped fitting piece to the vertical walls, and keep it in the open position above the housing portion.

In the particular embodiment as shown in the drawings, the fitting piece 4 is composed of two wings 4a, 4a, and a thin hinge connection 4b, thus the fitting piece 4 is capable of being double folded with the wings facing and lying on each other. Each wing has a recess or concave portion 4c, and two opposite recess portions 4c provide an opening to accommodate an elongated object B such as a rod or a pipe when the fitting piece is folded around the object. Each wing 4a has an engaging pawl 4d provided on the outer side of the wing. In operation, the fitting piece functions to guide the elongated object B to the inside of the housing portion 3, and to grip the object in the folded position. In the normal position the fitting piece 4 is supported by the flexible supporting portions 5, 5, and is open above the housing portion 3 as shown in FIG. 1. In inserting an object B in the housing portions, the object is put in the recess portions of the wings, and the wings are put on each other by closing the fitting portion with fingers. Then, the so closed fitting is pushed into the housing portion, and thus the object B is fixedly caught by the device.

As mentioned above, the object B is wrapped by the fitting piece 4, and the so wrapped object is pushed in the housing 3. Therefore, the object B is not subjected to any friction which might cause injury to the surface appearance of the object if it is made of a soft plastic material. Because of no fear of marring the surface appearance of an object held, the pair of opposed vertical walls 3a can be made thick enough to provide an increased resilient grip on the object.

Preferably, the grip device according to this invention is integrally moulded of such a hard plastic material that it gives a strong resilient force to the housing portion and, at the same time that it gives to the fitting piece a stoutness which is sufficient to allow the folded fitting to invade the opening of the housing against the resilient and expulsive force of the vertical walls of the housing. This force will turn from expulsive to compressive when the housing yieldingly allows the folded fitting to invade into the opening of the housing, and the housing fixedly clamps the object which is wrapped by the folded fitting piece.

In removing the object B from the clamp device, a tool such as a screw driver is forcedly inserted in between the opposed wings 4a of the folded fitting piece 4 to open the opposed vertical walls 3a wide enough to release the engaging projections 3b of the vertical walls 3a from the engaging pawls 4d of the wings 4a. Then, the folded fitting piece 4 is pulled out from the housing 3. The fitting piece 4 is unfolded, and the object B is removed.

As seen from the above, the clamping-and-fixing device according to this invention is very useful in fixing a pipe, a rod and any other elongated body. The device is very easy and reliable in operation.

With a view to making the clamping-and-fixing device effective and reliable in action it is better to make the recess portion 4c of the wing 4a somewhat smaller than the diameter of the elongated body B to be clamped, and also it is better to make the total thickness of the wings 4a of the fitting piece 4 somewhat larger than the distance between the opposed vertical walls 3a.

Although a single particular embodiment of this invention is fully described above, this should not be understood as limitative, and a variety of modifications can be made without departing from the scope of the invention.

What is claimed is:

1. A one-piece plastic device for fixing elongated, cylindrical items relative to an apertured support structure, said device includes a base portion, anchoring means vertically provided on the under side of the base portion, a U-shaped housing portion provided on the top side of said base portion and having a pair of opposed vertical walls, each of said walls carrying an engaging projection extending inwardly from each wall in opposed relation adjacent the free end of each wall, an initially V-shaped fitting piece capable of being hinged about the base line of the V and initally positioned above the open end of the U-shaped housing, said V-shaped fitting piece being defined by a pair of wings interconnected at the base of the V along said hinged base line and each wing being connected adjacent its upper extremity through a flexible resilient strap-like member with one of said vertical walls at a point spaced from the free end of the vertical wall, each of said wings being provided on its outboard surface with an engaging pawl, each wing having a first portion of one thickness in transverse section for a substantial portion of its length adjacent the hinged base line and thence provided with a radiused portion of greater thickness than said first portion adjacent the free end of each wing and projecting toward the other wing to define a recess when said wings are folded about said hinged base line toward one another into opposed relation, said wings, when folded, being received within the throat formed by said U-shaped housing portion with said pawls engaging said projections adjacent the free end of the adjacent arm, whereby an elongated rod or the like is introduced into the recess of the wings being captured when said wings are folded inwardly and positioned within the U-shaped housing portion.

2. A device according to claim 1, wherein said recess is somewhat smaller than the diameter of said object and the total thickness at said pawls of the opposed wings of said fitting piece when folded, is somewhat larger than the distance between the said opposed vertical walls of said housing portion at said projections.

* * * * *